3,134,846
DOWELLING CONSTRUCTION FOR PERMITTING MISALIGNMENT BETWEEN ELECTRICALLY INSULATED PLATES
Peter Eastcott, Peterborough, Ontario, Canada, assignor to Canadian General Electric Company Limited, Toronto, Ontario, Canada, a corporation of Canada
Filed June 28, 1962, Ser. No. 206,001
5 Claims. (Cl. 174—138)

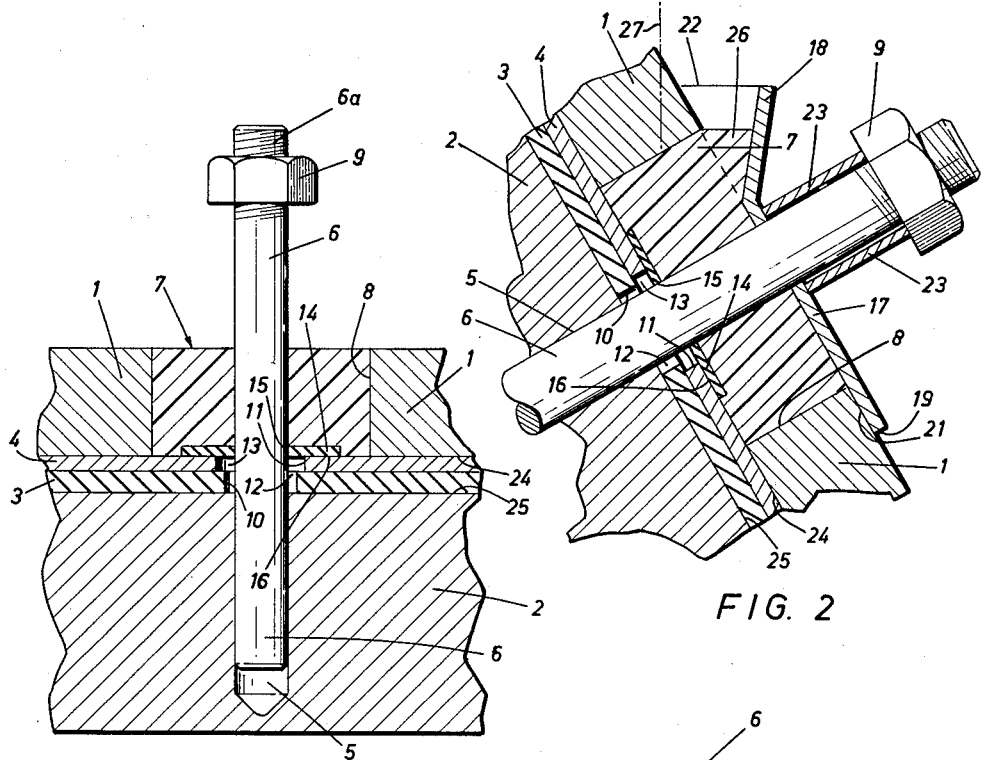
FIG. 1
FIG. 2
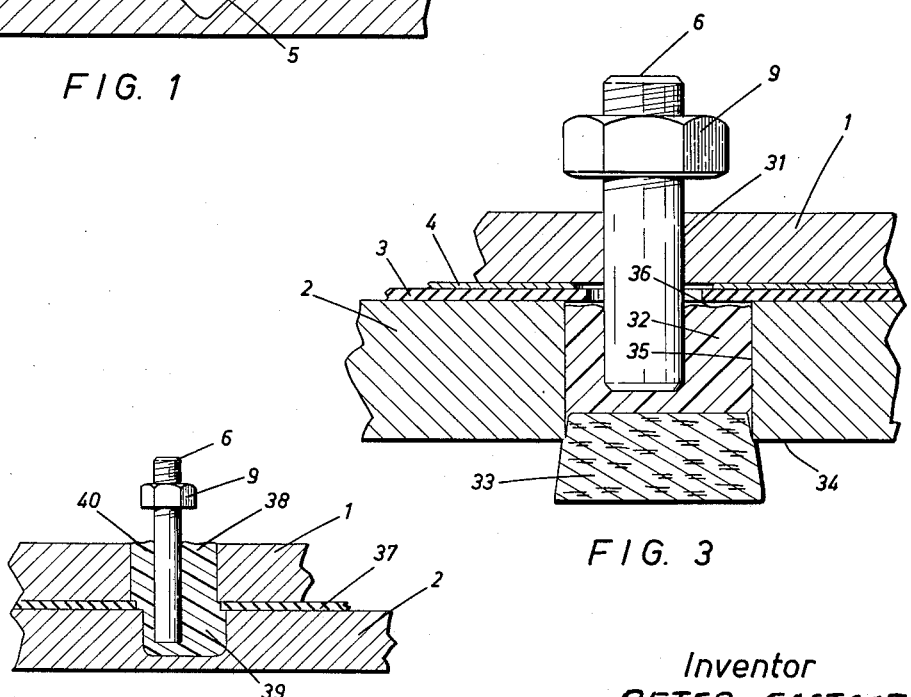
FIG. 3
FIG. 4
Inventor
PETER EASTCOTT
by: James R Campbell
Attorney United States Patent Office 3,134,846
Patented May 26, 1964

The invention described herein relates to dowelling constructions and more particularly to an improved insulated dowel useful in rotating electrical equipment.

A dowel pin serves two principal functions in machine construction: (a) to ensure that two mating parts, such as end bells and pedestals upon which bearing alignment depend, are maintained in the same relationship to each other as existed at the time the machine was set up and the dowel pin fitted; and (b) to ensure precise repositioning of the mating parts after a machine has been dismantled for maintenance. Without dowels, machine realignment would be necessary each time it was reassembled.

Electrical machinery requirements may introduce the further complication that the dowel must not galvanically connect the two surfaces being matched. The present practice therefore is to employ a steel dowel pin insulated with a fiber sleeve. In these constructions, a steel pin is contained within a fiber sleeve which separates the metallic portions of the pin from the walls of the pin receiving holes. Generally, insulated pins of this type do not perform an alignment function as accurately as the plain tapered pins normally used by machine manufacturers. For satisfactory results, the diameter of the holes, the diameter of the pin and the inside and outside diameters of the insulating sleeve must be carefully controlled, thus raising substantially the cost of the insulated dowel over that of an uninsulated component.

Even though great care is taken, conventional dowels may not be completely satisfactory in actual practice because large electrical machines are generally assembled on the factory test floor where the machine components are aligned and doweled before the machine is tested. Therefore, the dowel holes must be hand drilled and reamed at this stage rather than at an earlier stage at a work station during manufacture. After a non-self-supporting machine base has been lifted several times during shipment followed by placement in its final location, it is distorted slightly, and reconstruction of alignment using factory shims and dowels present both cost and construction problems. In these situations, it is necessary to realign the machine repeating the drilling, reaming and dowelling operations described above.

The primary object of my invention therefore is to provide a relatively simple, inexpensive insulated dowel useful in accurately aligning parts in electrical equipment.

Another object of my invention is to provide a dowel construction wherein a single drilling operation is performed once only at the factory, and the dowel is completed on site after final alignment.

Still another object of my invention is to provide a dowelling construction capable of accommodating alignment errors in machine components.

In carrying out my invention, I provide a drilled aperture in the base member with which other machine components are to be aligned and held in an immovable position. Appropriate insulating members are employed for electrically insulating the base from the other components of the machine. To provide for accurate alignment of these parts, an insulated dowel of a size capable of joining them together, is placed in the aperture in the base. The other part to be aligned with the base is equipped with an excessively large diameter opening through which the dowel extends to accommodate displacement of the dowel aperture or openings, such as that resulting from distortion of the machine components occasioned during shipment of the machine. A resinous composition capable of adhering to the walls forming the large diameter opening and the dowel surfaces is poured around the dowel after the parts are placed in position. Upon curing, the composition firmly anchors the dowel in position and effectively prevents displacement thereafter of the parts joined by the doweled structure. It will be apparent to those skilled in the art that the aperture and opening in the respective parts being joined may be reversed so that the base member may serve as the component which accommodates variations in dowel holes formed in the parts.

While the specification concludes with claims particularly pointing out and distinctly claiming the subject matter which I regard as my invention, it is believed the invention will be better understood from the following description taken in connection with the accompanying drawing in which:

FIGURE 1 is a sectional view in elevation of an embodiment of the invention showing a vertical dowel;

FIGURE 2 is a sectional view in elevation of an embodiment of the invention showing an inclined dowel; and FIGURES 3 and 4 are sectional views in elevations of other embodiments of the invention.

Referring now to the drawings wherein like reference characters designate like or corresponding parts throughout the several views, there is shown in FIGURE 1, a portion of the foot 1 of a frame for an electrical machine adapted to be supported on a base 2. Sandwiched between the mating faces 24, 25 of foot 1 and base 2 respectively is an insulating shim 3 and metal adjusting shim 4. Bore 5 in base 2 is drilled and reamed at the factory to substantially the same size as that of dowel pin 6, resulting in a snug or light interference fit between the inner surface of reamed bore 5 and the peripheral surface of pin 6. Preferably, bore 5 is perpendicular to face 25 of the base, but it may also deviate substantially from a perpendicular axis. An aperture 7 in foot 1 is considerably larger in diameter than bore 5, and it is located above the bore such that when the machine is positioned properly on its base, one end of dowel pin 6 can be inserted through aperture 7 into bore 5 and leave a substantial annular clearance between the dowel pin and the inner wall 8 of the aperture. Dowel pin 6 is of a well known type made of a metal such as steel, and it may be straight or tapered. If tapered, bore 5 will be tapered also to conform with the shape of the pin. Shims 3 and 4 are also apertured at 10 and 11 respectively, to receive pin 6.

To overcome the disadvantages inherent in present dowel constructions, and particularly those employing the fibrous types of insulating sleeves now in use, a resinous composition of initially viscous consistency is used for positioning and securing the dowel in an immovable position. As illustrated in FIGURE 1, the resin composition is shown filling the aperture formed by the walls 8 of foot 1. Since it displays great strength upon curing and adheres to the foot walls with great tenacity, it will be seen that it effectively constitutes an extension of the steel foot to the dowel surfaces.

In carrying out the steps of forming this improved doweled structure, the peripheral surface of dowel pin 6 is coated with a resin release medium, such as wax, and the pin then pressed into bore 5 in base 2 such that it extends through and beyond aperture 7. The surfaces of shims 4 and 3 forming a bottom for aperture 7 may be coated also with the release medium. The resinous composition comprising a mixture of resin and curing agent of readily flowing consistency is then poured around dowel pin 6 to fill the annular space between pin 6 and the inner wall 8 of aperture 7. With a resin such as an epoxy, the compound will set at room temperature resulting in a precision dowel comparable to the driven tapered dowel used on other machinery. A dowel insulation of high compressive strength and virtually infinite ground resistance is obtained.

An example of a resin formulation that has been used successfully is as follows:

| | Parts |
|---|---|
| Liquid epoxy resin (epoxide equivalent 185–200) | 100 |
| Silica flour—325 mesh | 100 |
| Red iron oxide pigment | 1 |
| Diethylene triamine | 10 |

The red iron oxide pigment and silica flour are intimately mixed, then added to the liquid epoxy resin and mixed thoroughly. This mixture, which constitutes Part A, has an unlimited shelf life. Immediately prior to intended use, the diethylene triamine, which constitutes Part B, is mixed thoroughly with Part A. After Parts A and B have been mixed together the mixture should be used immediately because it sets up readily at room temperature into a solid, rigid mass. This formulation is given by way of example only, and it is not intended to exclude other resins, fillers or hardeners, many of which would be equally suitable, and are well known in the art.

The inner wall 8 of aperture 7 preferably is rough finished to ensure an adequate bond with the resin. Dowel pin 6, having smooth surfaces coated with a release agent, may be removed readily by screwing a nut 9 onto the threaded end 6a of the pin and down onto suitable spacers located between the nut and the resin insert. Similarly, the application of release agent to the shims prevents adherence of the resin thereto.

For ease of manufacture and assembly, insulating shim 3 and adjusting shim 4 may be supplied with prepunched holes 10 and 11 respectively of relatively broad tolerance resulting in annular spaces 12 and 13 respectively, between dowel pin 6 and the inner surfaces of apertures 10 and 11. Because shim 3 is made of an insulating material, it may come into contact with pin 6, but shim 4 must not touch the pin in order to avoid the completion of an electrically conductive circuit from foot 1 to base 2 by way of the shim and pin. To facilitate disassembly, therefore, it may be desirable to prevent the resin from flowing into spaces 12 and 13. To this end, an insulating washer 14, of fiber or other suitable material is fitted around dowel pin 6 firmly against the top surface of shim 4. The washer is a snug or light interference fit on the pin as indicated at 15, and it overlays a substantial portion 16 of shim 4 adjacent aperture 11. Washer 14 is designed to serve as a dam between pin 6 and shim 4 to block the flow of liquid resin into spaces 12 and 13. It is to be noted that any cracks in the resin containing cavity through which the resin can seep out may be sealed off by means of a suitable putty, of which a number of types are readily available.

Referring now to FIGURE 2, there is shown an arrangement similar to that shown in FIGURE 1 except that dowel pin 6 is positioned at an angle from the vertical 27. In this instance, it is necessary to provide a device to prevent the resin from running out of the annular space between pin 6 and inner wall 8 of aperture 7 while in its liquid state. Accordingly, a substantially flat, circular retaining plate 17 formed with a spout-like projection 18 can be used to cover the top of aperture 7. Plate 17 has an outside diameter 19 larger than the diameter of aperture 7 and a central hole 20 of substantially the same diameter as dowel pin 6.

To complete the dowel after machine alignment, pin 6 is inserted through apertures 7, 11 and 10 into bore 5 of base 2. With nut 9 removed from the pin, washer 14 is placed around the pin against shim 4, and plate 17 is then slipped onto the pin and pushed against the upper surface 21 of foot 1, with spout opening 22 facing in a generally upward direction. The plate is held in place by a bushing 23 around pin 6 and by a nut 9 threaded down against the outer end of the bushing. Gaskets may be fitted at 20 and 21 to prevent resin leakage at the pin and foot. The liquid resin compound is then poured into the cavity defined by plate 17, pin 6 and wall 8 of aperture 7 through the opening 22 provided by spout 18. When the resin compound has cured to its solid state, nut 9, bushing 23, and plate 17 may be readily removed, the inner face of the plate having been coated with the release medium before coming into contact with the resin. The spout-shaped projection 26 of resin molded into spout 18 may, if desired, be removed by sawing, grinding, or other means.

The dowel described with reference to FIGURES 1 and 2 may be removed readily and replaced to permit realignment of the components 1 and 2. It has been pointed out that pin 6 may be withdrawn from its mounting by the application of an outward force on nut 9. The resinous body is now accessible and may be broken-up by means of ordinary hand tools such as a cold chisel and hammer. If available, a welding torch has been found useful in destroying the resin so it can be broken up more easily. However, in an arrangement such as this, it may sometimes be difficult to separate the foot from the shims and base due to leakage of liquid resin around washer 14 into spaces 13, 12 and into cracks between the foot and shim 4. Materials such as epoxy resins are good bonding agents, and if gluing together of the aforementioned parts is to be avoided, adequate seals should be provided in regions where resin penetration is unwanted. Moreover, liberal use of the release agent in regions such as 13, 12 will assist materially in the separation of the foot from the other parts.

In FIGURE 3 there is illustrated an embodiment of the invention in which resin leakage may be obviated. In this embodiment, foot 1 is provided with an aperture 31 adapted to receive pin 6 as a snug or light interference fit as in the case of bore 5, and base 2 is provided with an enlarged bore 32 situated directly below aperture 31. Bore 32 is large enough to provide a free space between its wall 35 and the lower portion of pin 6 for the full range of adjustments of the foot on the base. It may extend well into base 2 as does bore 5, or it may pass through the base and have its bottom end closed off by means of a stopper or cork 33. To dowel the foot to the base, a predetermined quantity of the liquid resin is poured into bore 32 through aperture 31, and pin 6 is then driven into aperture 31 down into the pool of resin contained in the bore. Insertion of the pin should cause the liquid resin to rise to a level 36 below the upper surface of the base, otherwise the resin will come into contact with shims 3, 4 and foot 1 and upon setting it will bond these elements to the base. Therefore, care must be exercised in measuring the quantity of resin to be used. Even though the surface of aperture 31 is coated with a release medium, it is recommended that this surface be kept free from resin while it is being poured into bore 32. The pin is also coated with the release medium so that it can be withdrawn if necessary.

The open ended bore in the base can be used to good advantage in those applications where the lower portion 34 thereof adjacent stopper 33 is accessible for removal of the resinuous insert in the event that redoweling is necessary. If bore 32 does not extend through the base or if the lower end of an open ended bore is inaccessible, it would be difficult indeed to remove the resinous body with the foot standing on the base in the way illustrated in FIGURE 3. Therefore there may be instances where the FIGURE 1 arrangement would be preferred over the FIGURE 3 arrangement and vice versa.

The FIGURE 4 embodiment shows a foot 1 standing on base 2 with an insulating shim 37 sandwiched between the foot and base. In this particular instance, hole 38 through the foot and hole 39 at least partly through the base, are substantially larger than pin 6 and are so disposed that the pin extends through hole 38 into hole 39 with a substantial clearance between the pin and the walls defining the holes. Hence the lower end of the pin is completely embedded in the resinous insert 40 contained within holes 38 and 39. The liquid resin may be poured into the cavity formed by holes 38 and 39 either before or after the pin is inserted and the pin is supported in the desired position until the resin hardens sufficiently to support it. It is to be noted that both resinous insert 40 and pin 6 extend through the foot into the base, and even after the pin has been withdrawn, the insert will tend to hold the foot in place on the base. Therefore, to separate the foot from the base the insert must either be removed by breaking it up or broken in two along the mating faces of the foot and base.

Although the dowel described above is particularly useful in the assembly of electric machinery wherein one member must be electrically insulated from another, it may also be used in other machinery in place of the conventional steel pin which is driven into a reamed hole in a pair of mating members.

This invention provides a simple and accurate insulated dowel for electrical machinery, which offers certain advantages: (a) a low cost dowel is possible because drilling is done once only and less reaming is needed, (b) greater freedom in alignment is allowed because of a large oversize hole formed in at least one of a pair of mating members, (c) mistakes are easily corrected by merely chipping the resin out of its retaining cavity and redoweling, (d) electrical grounds in newly drilled or reamed holes caused by metal chips are substantially reduced since these operations are completed at the factory before the parts are assembled, (e) no further machining is necessary if the machine is realigned, the resin is chipped free and the parts redoweled, (f) the breakage of drills or reamers is eliminated because it is no longer necessary to pass an oversize drill or reamer through existing holes which are slightly out of alignment.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A dowelling construction for accommodating misalignment between parts comprising first and second members in substantial alignment with each other, said first member having a bore, an aperture in the second member having a diameter substantially greater than the bore to allow for variations in the alignment of said members when placed in overlapping relationship, a dowel pin snugly fitted in said bore, means in said aperture having an opening defining walls in contact with the dowel pin surface, and a resinous composition cured to a hard rigid substance filling the aperture housing the dowel pin but not in contact with that portion of the pin positioned in the first member bore.

2. A structure for aligning an equipment supporting plate on a base comprising a bore in said base having a diameter sufficient to accept a dowel pin with a loose interference fit, an aperture in said plate substantially greater than the diameter of the bore to allow for variations in alignment when the plate is positioned on the base, insulation means between the plate and base, a washer of insulating material near the bottom of the aperture equipped with a central opening having walls in contact with the dowel pin which projects through the aperture, said washer, top surface of said insulation means and walls of the aperture defining a cavity open at the top, and a resinous composition cured to a hard rigid mass filling said cavity for preventing subsequent movement of the plate relative to the base.

3. The combination according to claim 2 wherein spacer means are disposed between the facing surfaces of the plate and base.

4. The combination according to claim 2 wherein a release agent is disposed on the dowel pin surface.

5. A structure for aligning an equipment supporting plate and a base comprising a bore in said plate, and an aperture in the base having walls defining an opening substantially greater than the bore to allow for misalignment between the base and the plate, a dowel pin projecting through the bore into said aperture, spacer means between the base and plate mating surfaces and equipped with an opening encompassing said pin but located in spaced relationship therewith, a resinous composition cured to a hard rigid mass encompassing that part of the pin located in the aperture but out of contact with the spacer means and plate, and a removable plug in the aperture in said base for containing the initially viscous resinous composition therein until it is cured to a hard mass.

References Cited in the file of this patent

UNITED STATES PATENTS

| | | |
|---|---|---|
| 1,856,723 | Phelps | May 3, 1932 |
| 1,886,176 | Gagnon | Nov. 1, 1932 |
| 2,473,105 | Luenberger | June 14, 1949 |
| 2,915,075 | Conrad | Dec. 1, 1959 |
| 3,037,070 | Sussman et al. | May 29, 1962 |